United States Patent [19]

Margerum et al.

[11] Patent Number: 5,096,282
[45] Date of Patent: Mar. 17, 1992

[54] POLYMER DISPERSED LIQUID CRYSTAL FILM DEVICES

[75] Inventors: John D. Margerum, Woodland Hills; Anna M. Lackner, Los Angeles; Elena Ramos, Santa Monica, all of Calif.; George W. Smith, Birmingham; Nuno Vaz, Bloomfield, both of Mich.; James L. Kohler, Kokomo, Ind., Charles R. Allison, Flint, Mich.

[73] Assignees: Hughes Aircraft Co., Los Angeles, Calif.; General Motors Corporation, Detroit, Mich.; Delco Electronics Corporation, Kokomo, Ind.

[21] Appl. No.: 498,076

[22] Filed: Mar. 23, 1990

Related U.S. Application Data

[62] Division of Ser. No. 141,033, Jan. 5, 1988, Pat. No. 4,938,568.

[51] Int. Cl.$^5$ .............................................. G02F 1/133
[52] U.S. Cl. .......................................... 359/3; 359/51.
[58] Field of Search ................... 350/334, 347 V, 348, 350/3.61, 3.62, 3.64

[56] References Cited

U.S. PATENT DOCUMENTS

| | | | |
|---|---|---|---|
| 4,251,137 | 2/1981 | Knop et al. | 350/348 |
| 4,673,255 | 6/1987 | West et al. | 350/347 V |
| 4,688,900 | 8/1987 | Doane et al. | 350/348 |
| 4,850,681 | 7/1989 | Yamanobe et al. | 350/334 |
| 4,878,741 | 11/1989 | Fergason | 350/334 |

FOREIGN PATENT DOCUMENTS

| | | | |
|---|---|---|---|
| 1255832 | 10/1989 | Japan | 350/334 |
| 8504262 | 9/1985 | World Int. Prop. O. | 350/334 |
| 8605282 | 9/1986 | World Int. Prop. O. | 350/334 |

Primary Examiner—Stanley D. Miller
Assistant Examiner—Anita Pellman Gross
Attorney, Agent, or Firm—V. D. Duraiswamy; W. K. Denson-Low

[57] ABSTRACT

A method of forming a polymer dispersed liquid crystal (PDLC) film is disclosed which consists of forming a solution of LC dissolved in a monomer, photopolymerizing the solution to form a film having a dispersion of LC bubbles therein, establishing a correlation between the LC bubble size and selected characteristics of the film, selecting a LC bubble size corresponding to desired film characteristics, and controlling the conditions of photopolymerization to achieve said LC bubble size. The LC bubble size is controlled by means of the UV exposure intensity, exposure temperature, exposure wavelength, LC concentration and/or concentration of polymerization initiator. Correlations are noted between LC bubble size and the resulting film's threshold and operating voltages for optical transmission, contrast ratio, absolute transmissivity and electro-optical response times. Special types of films, including in situ gratings and holograms, are obtained by periodically varying the conditions of polymerization over the film to produce a corresponding periodic spatial variation in the LC bubble size; different processes used to achieve this result are noted. Films with LC bubbles in a new size regime that significantly decreases the operating voltage threshold, and with gradients in the bubble size, are also disclosed.

7 Claims, 14 Drawing Sheets

DIAGRAM OF PDLC FILM FORMED BY UV EXPOSURE THROUGH A PARTIALLY TRANSPARENT RULING

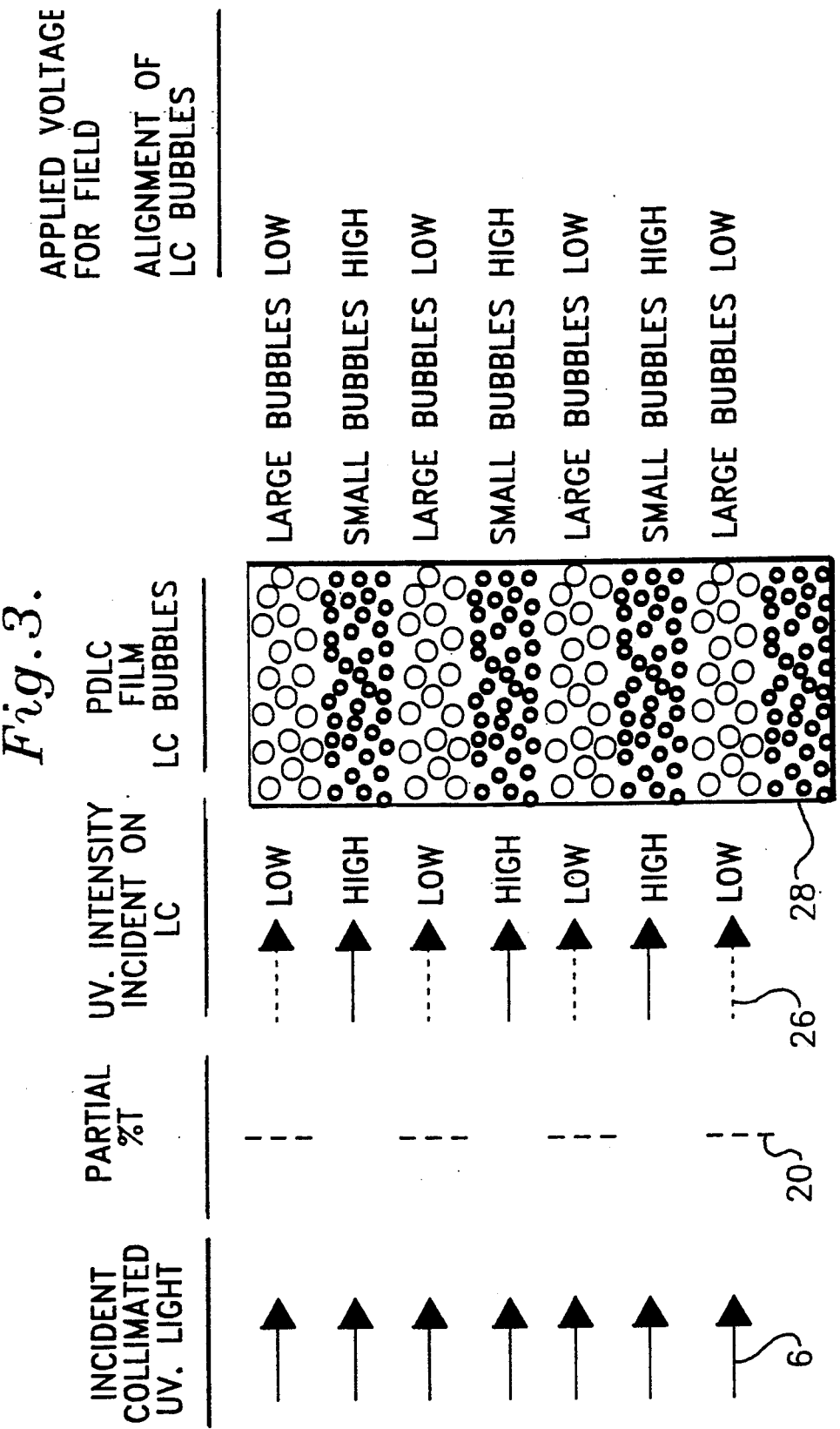
DIAGRAM OF PDLC FILM FORMED BY UV EXPOSURE THROUGH A PARTIALLY TRANSPARENT RULING

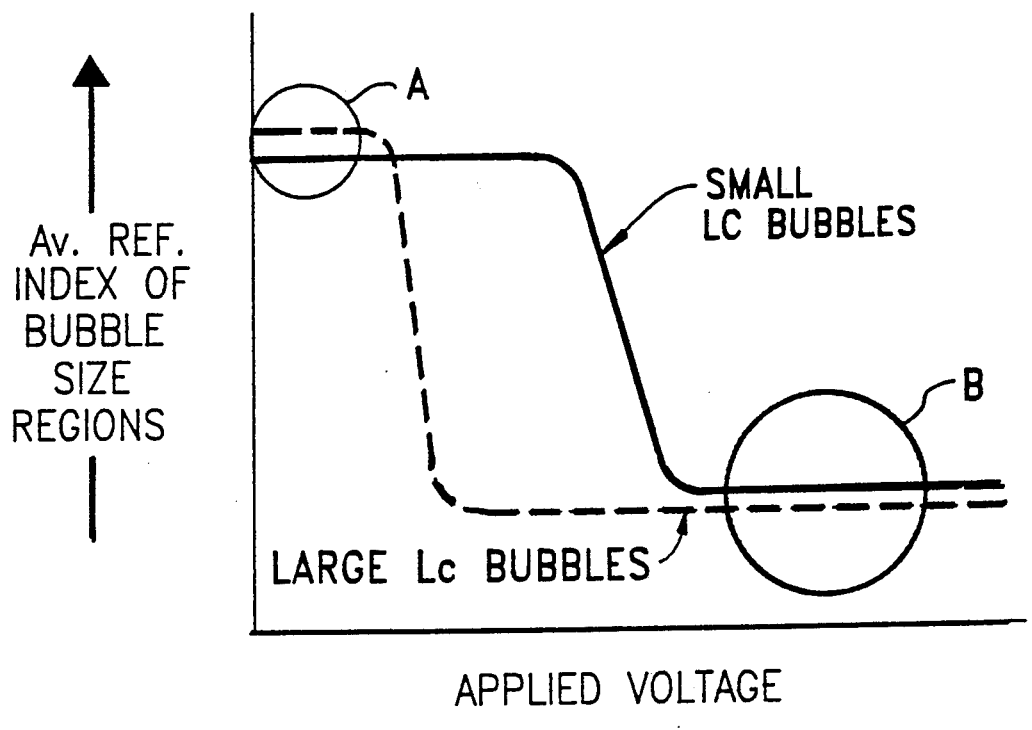
Fig. 4.a.
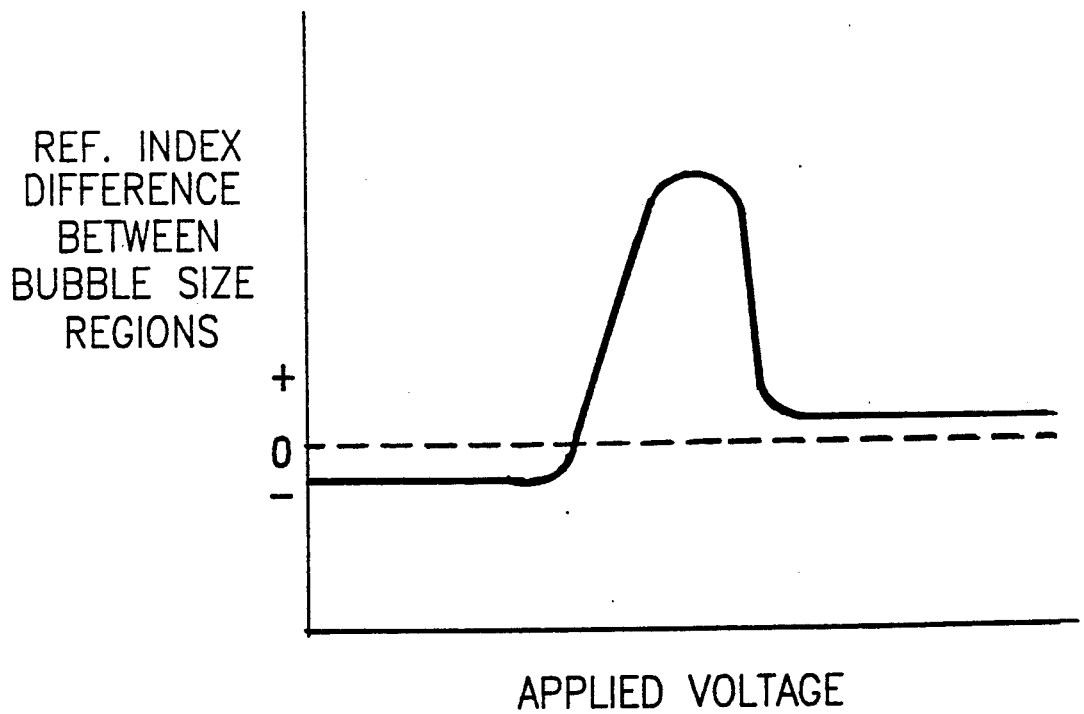
Fig. 4.b.

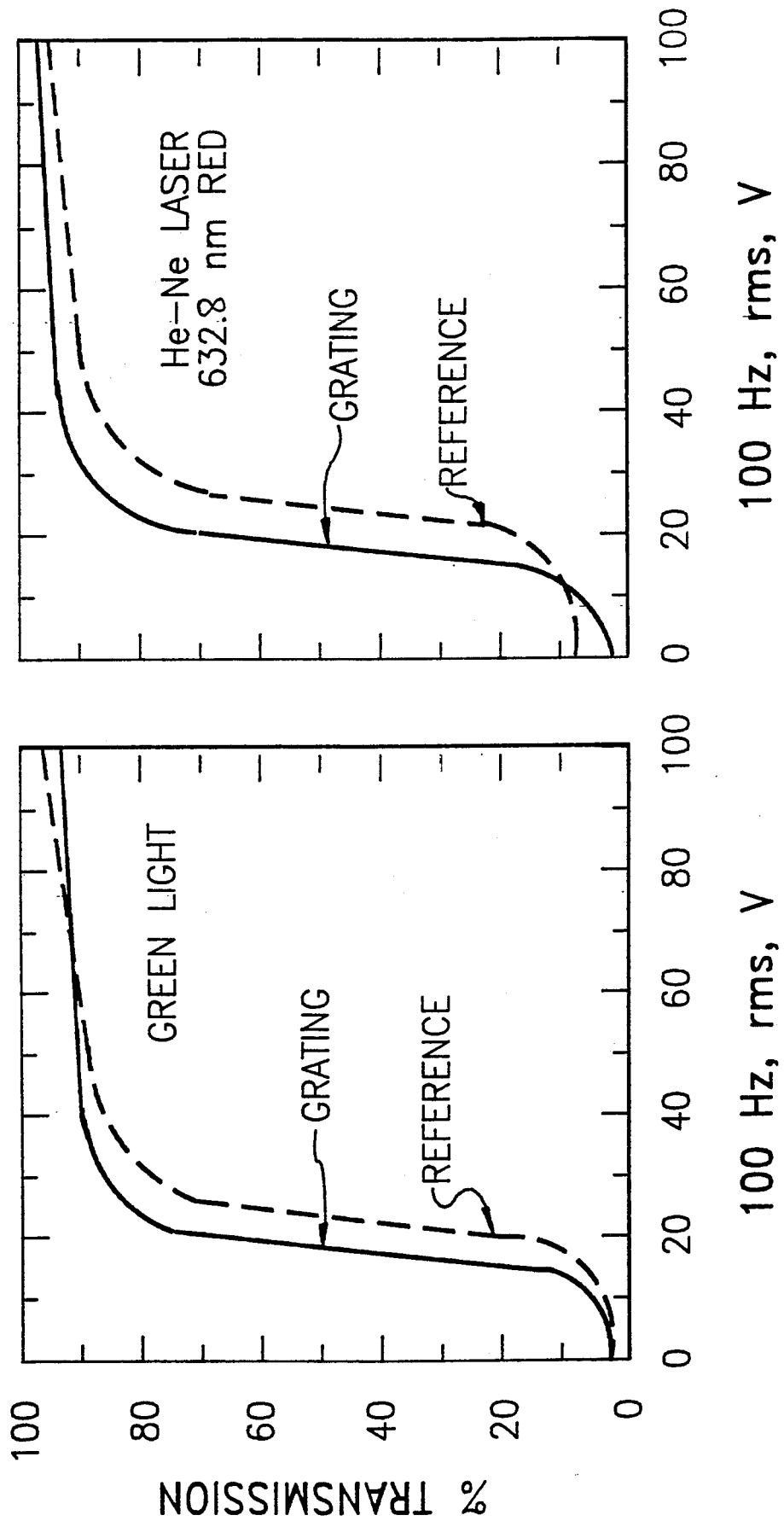
Fig. 16.a.
Fig. 16.b.

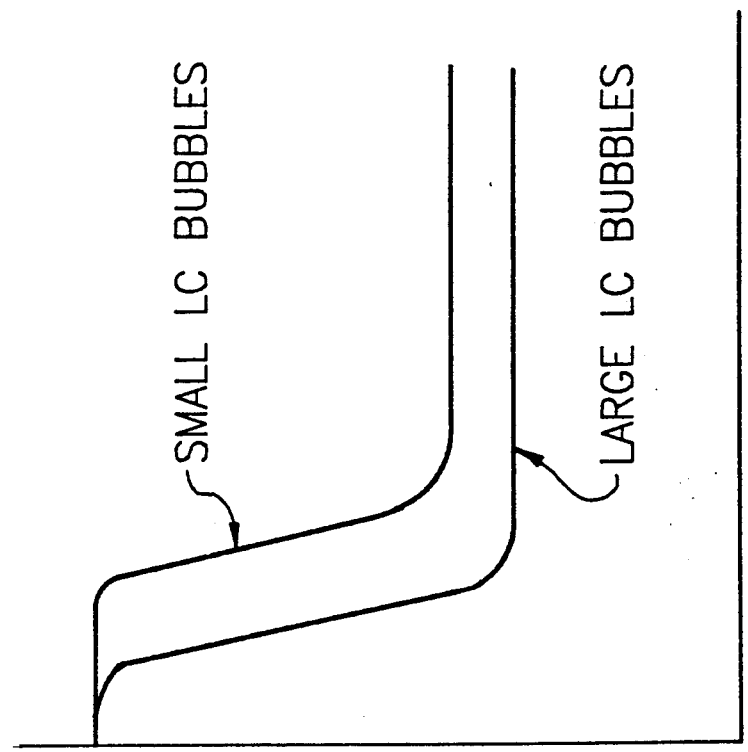
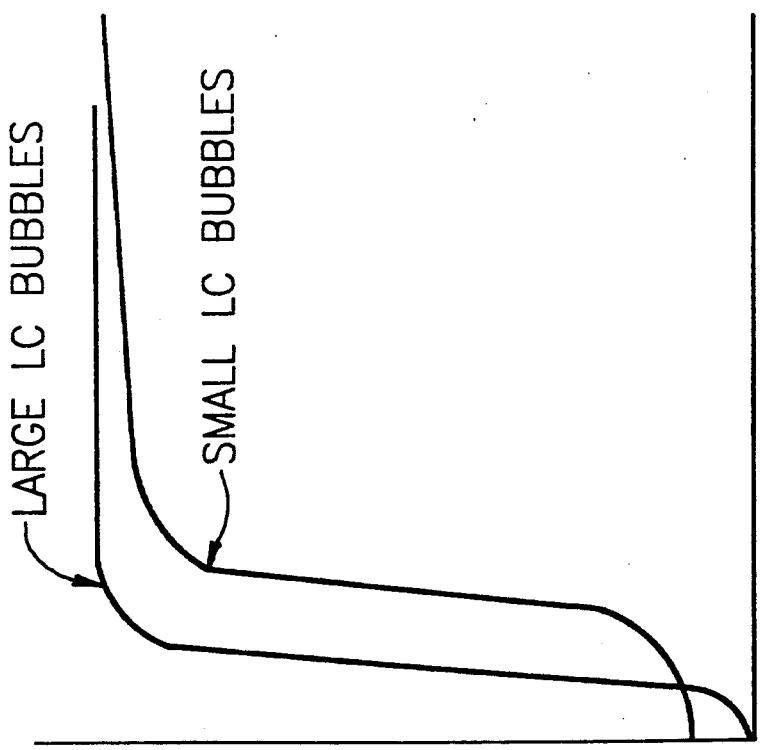

POLYMER DISPERSED LIQUID CRYSTAL FILM DEVICES

This is a division of application Ser. No. 07/141,033, filed Jan. 5, 1988, now U.S. Pat. No. 4,938,568.

BACKGROUND OF THE INVENTION

1. Field of the Invention

This invention relates to polymer dispersed liquid crystal films and devices, and to methods of forming the same by controlling the conditions of photopolymerization to control the properties of the film.

2. Description of the Related Art

A new type of material referred to as a polymer dispersed liquid crystal (PDLC) film has been developed recently which has applications to various electro-optical switching devices, such as display modules for automobile dashboards, low voltage displays for optical shutters, and optical diffusers. The material is described in U.S. Pat. No. 4,688,900, issued Aug. 25, 1987 to Joseph W. Doane et al., and assigned to Kent State University. The PDLC film consists of droplets or bubbles of liquid crystal dispersed in a clear or light transmitting, flexible plastic sheet or film. The PDLC film is capable of being thermally, electrically, magnetically and electromagnetically addressed to cause the material to be reversibly switched between a light scattering mode and a light transmissive mode. The material is optically responsive to strain, so that under tension it acts as a polarizer that transmits one component of plane polarized light while scattering the other component. Curing the material in the presence of an electric or magnetic field also causes it to act as an electrically addressable polarizer.

The PDLC may be prepared by dissolving liquid crystal in an uncured monomer resin and then curing or polymerizing the resin so that bubbles or droplets of liquid crystal spontaneously form and are uniformly dispersed throughout the matrix. The exact "curing" method is not described, but it is known that PDLCs may be cured by a photopolymerization process of exposure to ultraviolet light. The patent also suggests that epoxy resins which are curable by UV radiation are useful. The resulting liquid crystal droplets are described in the patent as being of uniform size and spacing, and having a diameter ranging upward from about 0.2 microns depending primarily upon the curing procedure and the specific materials used.

The PDLC is described as exhibiting a reversible, high contrast optical response from an opaque scattering mode to a clear light transmission mode when either the temperature of the material is changed, or an electric field is applied. The material is optically responsive to strain, whereby under tension it acts to polarize incident light.

While the described PDLC represents a significant advance in film displays, further improvements would still be desirable. For example, the general approach described for modifying the properties of the film is to alter the materials used; a way to control the film's operating characteristics without having to tailor each different operating characteristic to a different set of materials would be highly desirable. Also, greater flexibility in the permissible uses of the film would be desirable. Existing PDLCs also typically require an operating voltage in the range of about 60-100 volts, and it would be advantageous to be able to significantly reduce this voltage level.

SUMMARY OF THE INVENTION

The present invention provides a more flexible way of forming a PDLC so that the characteristics of the resulting film may be specially tailored to its intended use through control of the fabrication process. In particular, the desired film characteristics are achieved by a deliberate control over various photopolymerization conditions, including the intensity of an ultraviolet photopolymerizing exposure, the temperature at which the exposure takes place, the liquid crystal concentration within the monomer solution prior to polymerization, the concentration of initiator in the solution, and the wavelength of the exposure light.

Several unique types of PDLC films are obtained by spatially varying the conditions of polymerization over the film so that the sizes of the liquid crystal bubbles are also spatially varied. In one implementation, the exposure intensity is spatially varied by exposing the film through a mask which has a spatial variation in transmissivity. The mask may be at least partially transmissive over its entire area, thereby enabling substantially the entire film to polymerize at about the same time, but at spatially varying polymerization rates corresponding to the spatial variation in mask transmissivity. Alternately, polymerization may take place in a two-step process by an exposure with the mask in one step, and an exposure without the mask at a different exposure intensity in another step.

The liquid crystal bubble size may be correlated with various characteristics of the resulting PDLC film, such as the threshold and operating voltages for optical transmission, contrast ratio, absolute transmission levels, transmission wavelengths and optical response times. The bubble size may be reduced by increasing the ultraviolet exposure intensity, or increased by reducing the exposure intensity. The resulting film's threshold and operating voltages for optical transmission have been found to increase with exposure intensity, and for a given PDLC film thickness the contrast ratio also increases while the optical response time decreases with exposure intensity. Also, necessary operating voltages may be significantly reduced by controlling the polymerization conditions so that the liquid crystal bubble diameters are in the approximate range of 1-5 microns.

Unique films may be formed by special controls over the exposure intensity. Diffraction gratings can be created within the film by spatially varying the exposure intensity in a periodic fashion; the periodicity distance of the bubble size variation is preferably substantially larger than the bubble size generated. A film may also be polymerized by exposing it with a pair of laser beams which are directed onto the liquid crystal-monomer solution at appropriate angles to produce a holographic interference pattern in the film. In some cases it may be desirable to produce a spatial gradient in the liquid crystal bubble size within the film by establishing a corresponding a spatial gradient in the exposure intensity.

These and other features and advantages of the invention will be apparent to those skilled in the art from the following detailed description of preferred embodiments, taken together with the accompanying drawings, in which:

DESCRIPTION OF THE DRAWINGS

FIG. 3 is a combined diagram and chart relating a periodic variation in liquid crystal bubble size with a corresponding periodic variation in the exposure intensity, and the applied voltage necessary for field alignment of the resulting liquid crystal bubbles;

FIGS. 4a and 4b are hypothetical graphs relating the refractive index of a PDLC film to its liquid crystal bubble size;

FIGS. 16a and 16b are graphs showing the electro-optic transmissivity at two different wavelengths for a PDLC provided with gratings in accordance with the invention;

FIGS. 17a and 17b are graphs illustrating the possible effects of varying liquid crystal bubble size upon the electro-optic transmissivity and refractive index, respectively, of the grating PDLC of FIGS. 16a and 16b;

DETAILED DESCRIPTION OF PREFERRED EMBODIMENTS

Figure 1:
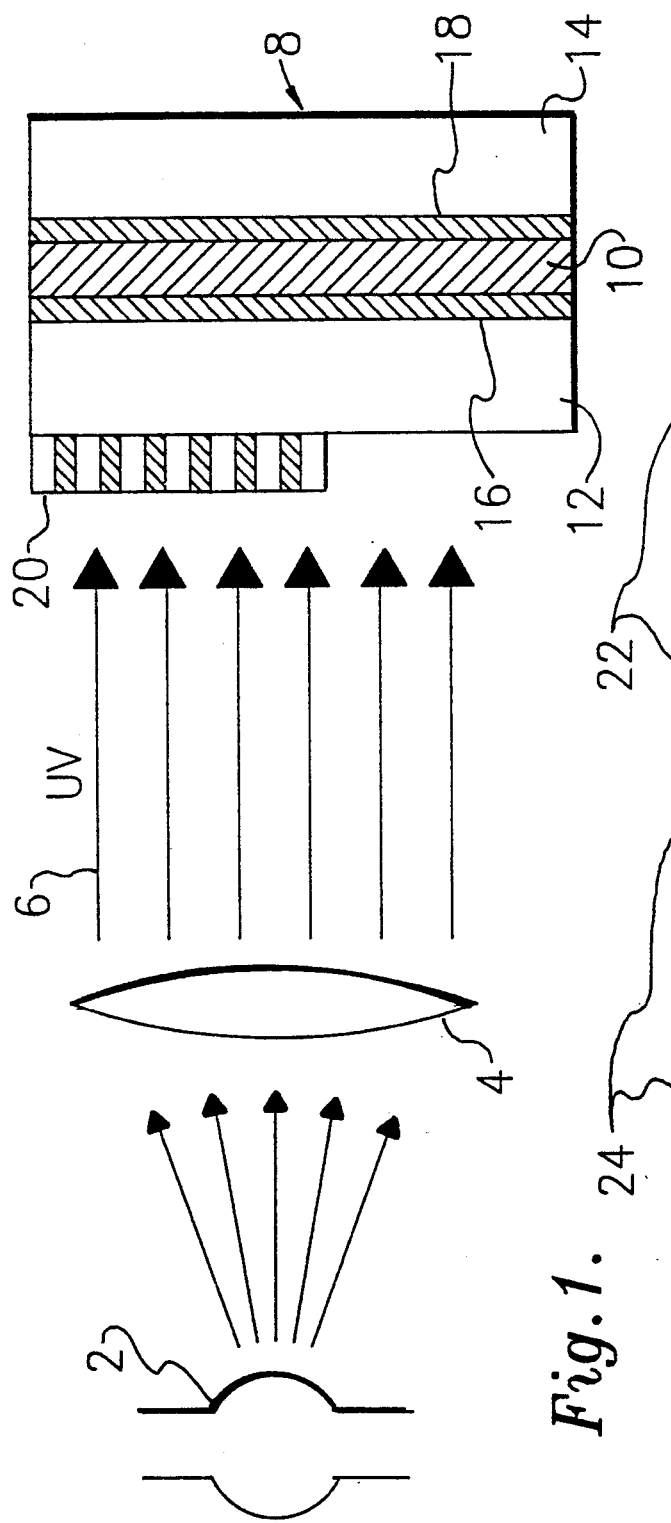
FIG. 1 is a simplified diagram of a system used for controlled photopolymerization of a PDLC in accordance with the invention.

It has been discovered that numerous characteristics of a PDLC film can be altered by varying the size of the LC bubbles within the film, and that in turn LC bubble size can be controlled by carefully selecting the environment in which film polymerization takes place. In particular, unique types of PDLC films with properties not previously available can be achieved by varying the polymerization conditions over the film area, and thereby achieving a non-uniform LC bubble size. The properties of the film will then depend upon the manner in which the non-uniformity is implemented.

The amount of light which PDLC films will transmit varies in accordance with a voltage signal applied to the film. In general, the films exhibit high scattering and low transmissivity at low voltage levels, a high transmissivity at high voltage levels, with a transition region in-between. Characteristics which have been determined to be at least partially dependent upon the LC bubble size within the film are the threshold voltage for optical transmission (defined as the voltage at which the film's transmission is 10% of full transmission); the contrast ratio (the ratio between maximum and minimum transmission levels); the absolute transmission levels; the wavelengths at which significant off-state transmission takes place; and the response times for the film to gain or lose transmissivity when an applied voltage signal is turned on or off.

For a PDLC film polymerized by exposure to ultraviolet light, the LC bubble size has been found to increase with lower exposure intensities, and to decrease with greater exposure intensities. In turn, the film's threshold and operating voltages for optical transmission can be increased by reducing the bubble size (increasing the exposure intensity) or decreased by increasing the bubble size (reducing the exposure intensity); its contrast ratio and absolute transmissivity can be increased by decreasing the bubble size (increasing the exposure intensity) or decreased by increasing the bubble size (decreasing the exposure intensity); its optical response times can be increased by increasing the bubble size (reducing the exposure intensity) or decreased by decreasing the bubble size (increasing the exposure intensity). The temperature at which polymerization takes place and the LC concentration can also be selected to determine the film's electro-optic properties, as described in some of the examples below. In general, smaller LC bubbles are formed at higher temperatures and with lower LC molecule concentrations.

Although the PDLC films with smaller LC bubbles have better off-state scattering, they require higher threshold voltages and higher operating on-state voltages than the same thickness films with larger LC bubbles. Not all of the LC molecules appear to separate out as LC bubbles of appreciable size. Rather, a residual amount of LC is left in the polymer in what is believed to be a combination of plasticized and extremely fine bubble states. The residual LC remaining in the polymer effects the film's refractive index because the average refractive index of the LC molecules is different from that of the polymer (the LC usually has a higher refractive index).

A polymerization set-up for fabricating a PDLC film with a spatial variation in the LC bubble size is illustrated in FIG. 1. Radiation from a 200 watt mercury lamp 2 is collimated by lens 4 into an ultraviolet beam 6. The beam is directed onto the structure 8 which houses the PDLC. A selected LC is added to a monomer/initiator to obtain a homogeneous, isotropic LC-monomer solution 10, typically 0.25–0.5 mil thick. The solution 10 is sandwiched between glass plates 12 and 14 coated with ITO (indium tin oxide) films 16 and 18, respectively. The ITO coatings provide electrodes for applying a voltage signal across the PDLC film. A mask 20 is placed over a portion of the surface of PDLC structure 8 which faces the UV beam, while the remainder of the structure may be left uncovered if desired to provide a reference area for comparison purposes.

Figure 2:
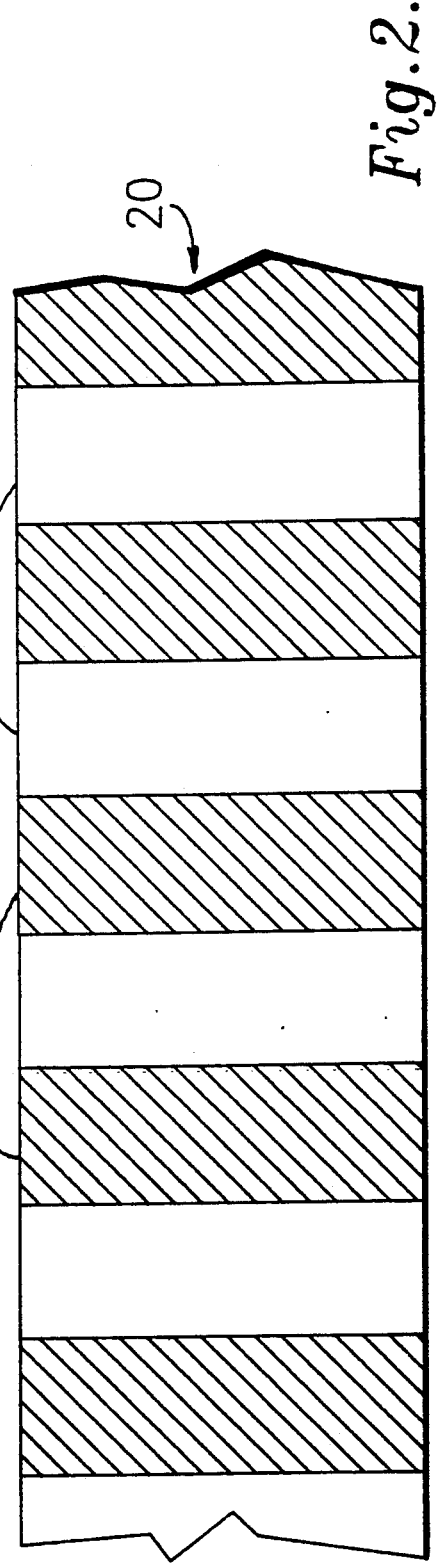
FIG. 2 is a plan view of a mask used to introduce periodic variations in liquid crystal bubble size into the PDLC.

Mask 20 is designed to impose a spatial variation in the amount of UV radiation reaching the underlying solution 10, with a corresponding spatial variation in its rate of polymerization. This in turn produces a spatial variation in the LC bubble size within the finished PDLC film, the distribution of LC bubble sizes being controlled by the mask design. FIG. 2 illustrates one type of mask that can be used to produce a periodic spatial variation in LC bubble size that yields a film with built-in diffraction gratings. The mask consists of transmissive areas 22 separated by periodic bands of lesser or zero transmissivity 24. The mask may be implemented as a Ronchi ruling with a transparent glass substrate, with bands 24 formed by metal strips on the substrate. When the bands 24 completely block the UV radiation, polymerization can be performed in a two-step process. In the first step, mask 20 is held in place over the film structure 8, and the portions of solution 10 which are not blocked by the mask are at least partially polymerized by exposure at a given UV intensity. This results in the formation of relatively small LC bubbles in the exposed regions. The mask is then removed and the film exposed again, but at a lesser UV intensity, resulting in the formation of relatively larger LC bubbles in the areas not previously polymerized. Alternately, the masked exposure could be performed at a lesser UV intensity than the unmasked exposure.

Another photopolymerization method which employs the mask of FIG. 2, but with thin metallic bands that are only partially blocking to UV light, is illustrated in FIG. 3. The UV beam 6 is transmitted through mask 20 to produce a periodically alternating pattern 26 of relatively high and low UV intensities. This pattern is applied to the monomer/LC solution, causing it to polymerize into a PDLC film 28 at polymerization rates corresponding to the intensity of the applied UV light at each point. The resulting film has a periodically alternating pattern of relatively larger and smaller LC bubbles, corresponding to the low and high UV intensity areas. The relatively low voltage that needs to be applied across the film for field alignment of the larger LC bubbles, and the relatively higher applied voltages necessary for the smaller bubbles, are also indicated in FIG. 3. With an appropriate selection for the periodicity of the LC bubble size variation, which preferably repeats itself approximately every 10–300 microns, the PDLC film 28 will exhibit diffraction gratings that make it very useful for various types of displays for optical switching devices. As described hereinafter, the polymerizing exposure could also be performed with a pair of interfering laser beams to produce a holographic interference pattern of LC bubble sizes in the film, with a bubble size periodicity of a few microns.

A hypothetical graph of the average refractive index for alternating regions of relatively smaller and larger LC bubbles, as a function of the voltage applied across the PDLC film, is given in FIG. 4a. With a low applied voltage, the refractive index of the larger bubble regions is somewhat greater than that of the smaller bubble regions, while the reverse is true at a high voltage regime designated B in FIG. 4a. In the intermediate voltage range, the refractive index of the large LC bubbles is believed to undergo a decline at a lower voltage level than for the smaller bubbles. This difference is illustrated in FIG. 4b, which shows the difference in refractive indices between the larger and smaller bubbles over the same voltage range; a greater refractive index for the small bubble regions is indicated by a positive value, and for the large bubble regions by a negative value. It is believed that the formation of diffraction gratings is related to the large refractive index difference between alternating regions in the intermediate voltage regime.

Gratings can be obtained with both high and low $\Delta n$ (n equals refractive index) LCs. For high $\Delta n$ LCs the gratings will be superimposed upon a light scattering effect, while for lower $\Delta n$ LCs the PDLC film will have less scattering but will still exhibit in situ gratings. The LCs could have a positive, negative or crossover (frequency dependent) dielectric anisotropy.

Figure 5:
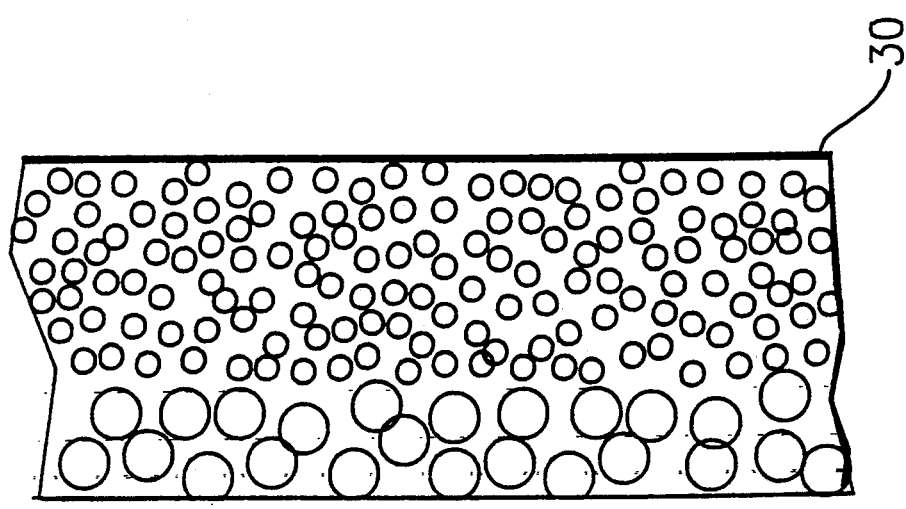
FIG. 5 is a fragmentary sectional view of a PDLC film whose polymerization has been controlled to produce a gradient in the liquid crystal bubble size.

In some cases it might be advantageous to form the PDLC film with a gradient in the LC bubble size across the film thickness. Such a film 30 is illustrated in FIG. 5, with larger LC bubbles on one side and smaller bubbles on the other side. This type of film offers the possibility of better light scattering properties over a broad range of wavelengths, such as solar radiation. The bubble size gradient could be implemented by using a high concentration of initiator in the solution from which the film is formed and by using a HV wavelength range where there is partial absorption by the monomer or LC components, such as in the 300–350 mm range for the Norland NOA-65/BDH-E7 system. This will result in an appreciable absorption of the activating UV through the cell thickness, causing the polymerization rate to vary through the depth of the cell. The result is a bubble size distribution such as that illustrated in FIG. 5, in which the UV exposure light is directed from right to left to yield smaller bubbles near the right (front) side of the cell and larger bubbles at the left (rear) side.

Figure 11:
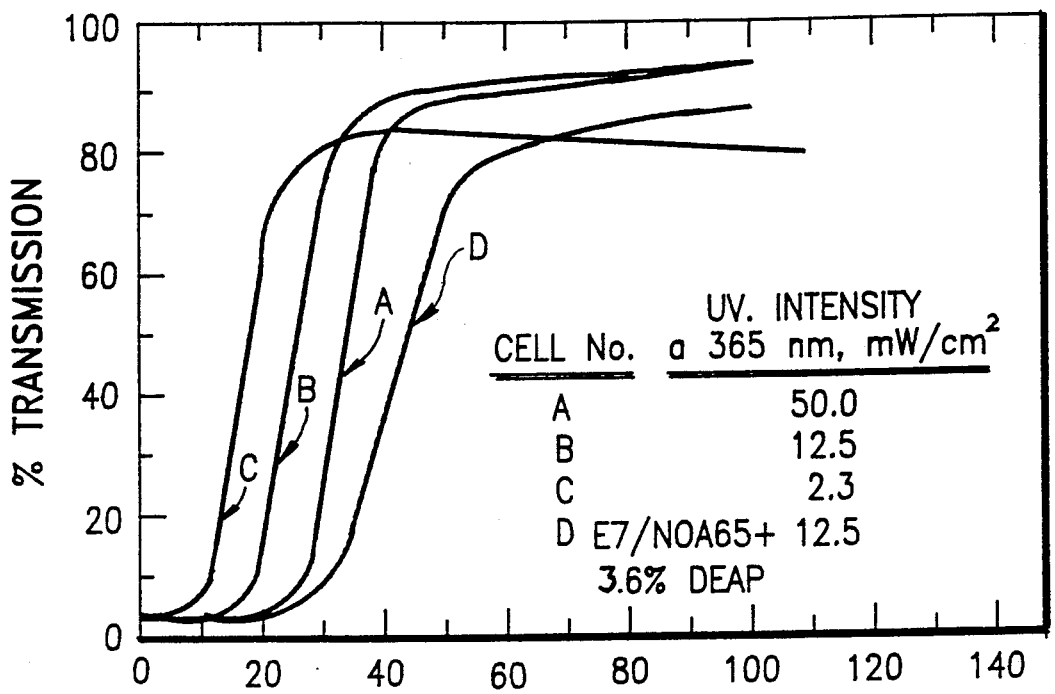

The Norland Products NOA-65 monomer employed in the above examples includes its own photopolymerization initiator. Other initiators can also be used, such as benzophenone 2,2-diethoxyacetophenone (DEAP), benzoin or benzil as additives to Norland NOA-65 or other suitable polymerizable mixtures. For example the addition of DEAP to Norland NOA-65 results in the formation of smaller LC bubbles than without the added initiator, as shown in FIG. 11.

The wavelength of the UV radiation used in the polymerization process can also be used to control the properties of the PDLC film. By choosing the UV wavelength to correspond to stronger UV absorption of the initiator, a faster photopolymerization will occur with an accompanying smaller bubble size, greater contrast ratio, absolute transmissivity, and threshold and operating voltages for optical transmission, and reduced electro-optic response times. Converse effects can be achieved by selecting the UV wavelength so that it corresponds to a weak UV absorption of the initiator, on the absorption shoulder closer to the visible range. As a specific example, benzophenone as a photopolymerization initiator has a peak absorption in the range of about 320–340 nm, and decreasing absorption at longer UV wavelengths. At 365 nm the absorption rate is about 0.32 times the peak value, but small size bubbles will be formed at relatively high UV intensity. The absorption rate is only about 0.8 times the peak value at 380 nm, and large size LC bubbles will result for the same exposure intensity at this wavelength.

One of the distinct advantages of the present invention is that it makes it possible to prepare PDLC films that require significantly lower operating voltages than previously. Operating voltages in the general range of 60-100 volts have been required in the past. However, with the new approach of tailoring the LC bubble sizes to the film's desired operating characteristics, operating voltages in the order of 15 volts can be achieved with large LC bubbles of about 5 microns diameter. The prior operating voltage range of 60-100 volts corresponds to an LC bubble size in the approximate range of 0.5-1 micron. Accordingly, the present invention opens up a new bubble size regime of about 1-5 microns, which has been found to yield a distinctly improved operating voltage.

Numerous different monomers and LCs may be combined in solution and photopolymerized in accordance with the present invention, and the LC concentration within the solution may be varied considerably. Several specific examples will now be related; these examples are intended to illustrate various implementations of the invention, and are not intended to be limiting.

EXAMPLE 1

PDLC samples were fabricated from NOA-65 optical adhesive produced by Norland Products, Inc. of New Brunswick, N.J., and BDH-E7 (British Drug House Ltd.) cyanobiphenyl liquid crystal mixture in a 1:1 ratio, by volume. The two components were thoroughly mixed and capillary filled between ITO coated glass substrates with a 0.5 mil Mylar ® spacer. The isotropic liquid filled test cells were exposed to UV radiation, using a 200 watt mercury lamp system and a water optical filter. The light intensity was regulated by the insertion of neutral density filters in the optical path, and the intensity was measured at a maximum wavelength of 365 nm. Three test cells were polymerized at 28° C. with UV intensities of 15.0, 3.5 and 1.0 mW/cm$^2$, with the lower intensity exposures requiring a longer polymerization period.

Figure 6:
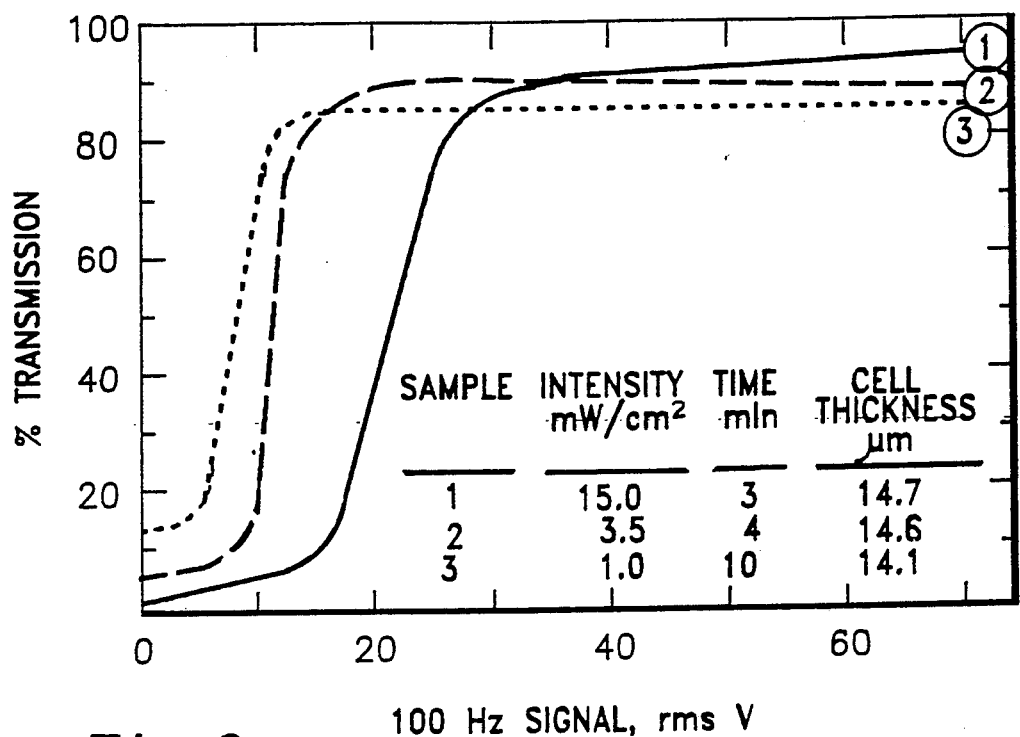
FIG. 6 is a graph relating the electro-optic transmission properties of three different PDLC films to varying UV exposure conditions in a first example.

A correlation of the electro-optical properties of the three samples with the light exposure intensity during photopolymerization is presented in FIG. 6. Both the low off-state transmission and the high threshold-operating voltage of the high intensity exposure sample are indications of small bubble size. These indications were experimentally verified by two separate techniques used for LC bubble size measurements. Spectral transmission curves of the scattering films showed a distinct change in slope (break) at a wavelength that is related to the bubble diameter, and were in good agreement with 1600× magnification microscope pictures taken. The second method used a laser light scattering technique, calibrated by scanning electron microscope measurements of the PDLC films. Both techniques showed a greater than two times decrease in bubble size for the highest intensity exposure.

EXAMPLE 2

Norland NOA-65 and BDH-E7 were again mixed in a 1:1 ratio, and the resulting isotropic liquid was used for drop filling ITO coated glass test cells with 0.25 mil spacers. The exposure system used was the same as for Example 1. Six sample cells were photopolymerized with 365 nm UV light intensities of 12.9, 11.7, 8.8, 4.2, 2.9 and 1.9 mW/cm$^2$, respectively. Electro-optical characteristics were measured on an optical set-up with a small acceptance angle, using an EG&G Gamma Scientific, San Diego, Calif., radiometer/photometer system with Model 550-19 integrating sphere for scattered light.

Figure 8:
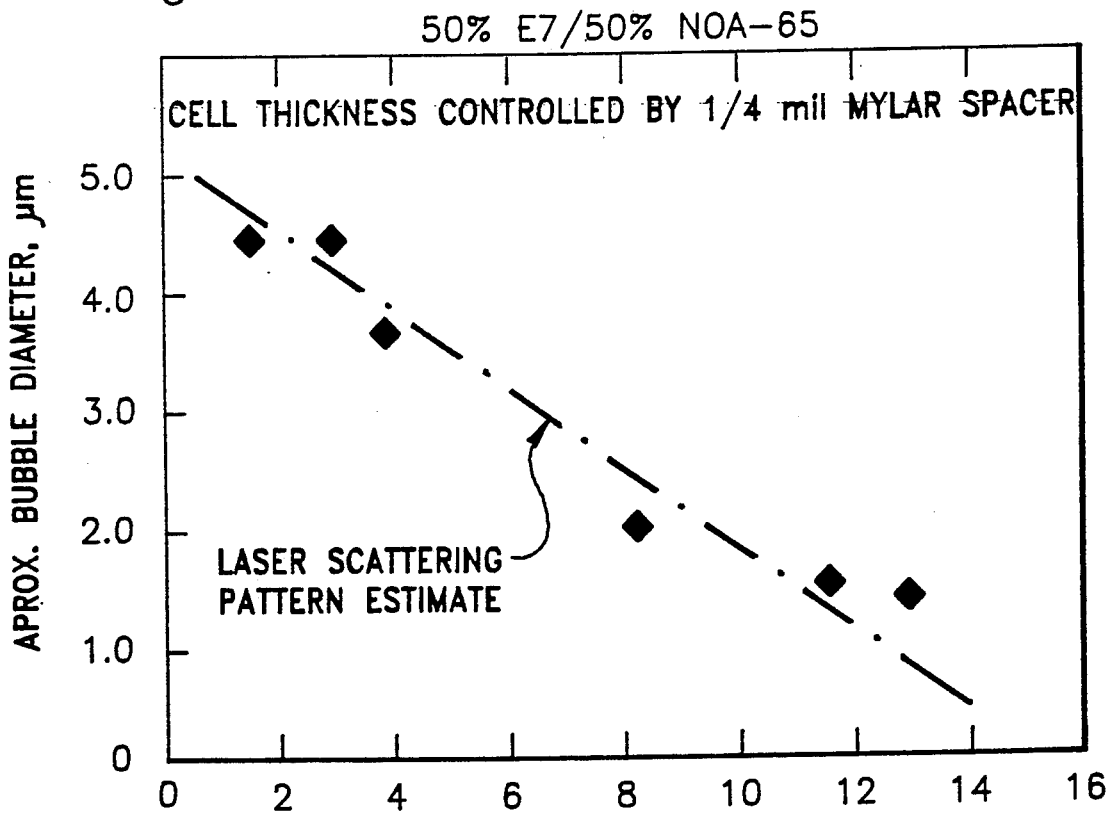
FIGS. 7, 8 and 9 are graphs for a second example which relate electro-optic transmissivity, liquid crystal bubble size and film contrast ratio, respectively, to the UV polymerization exposure intensity.
Figure 7:
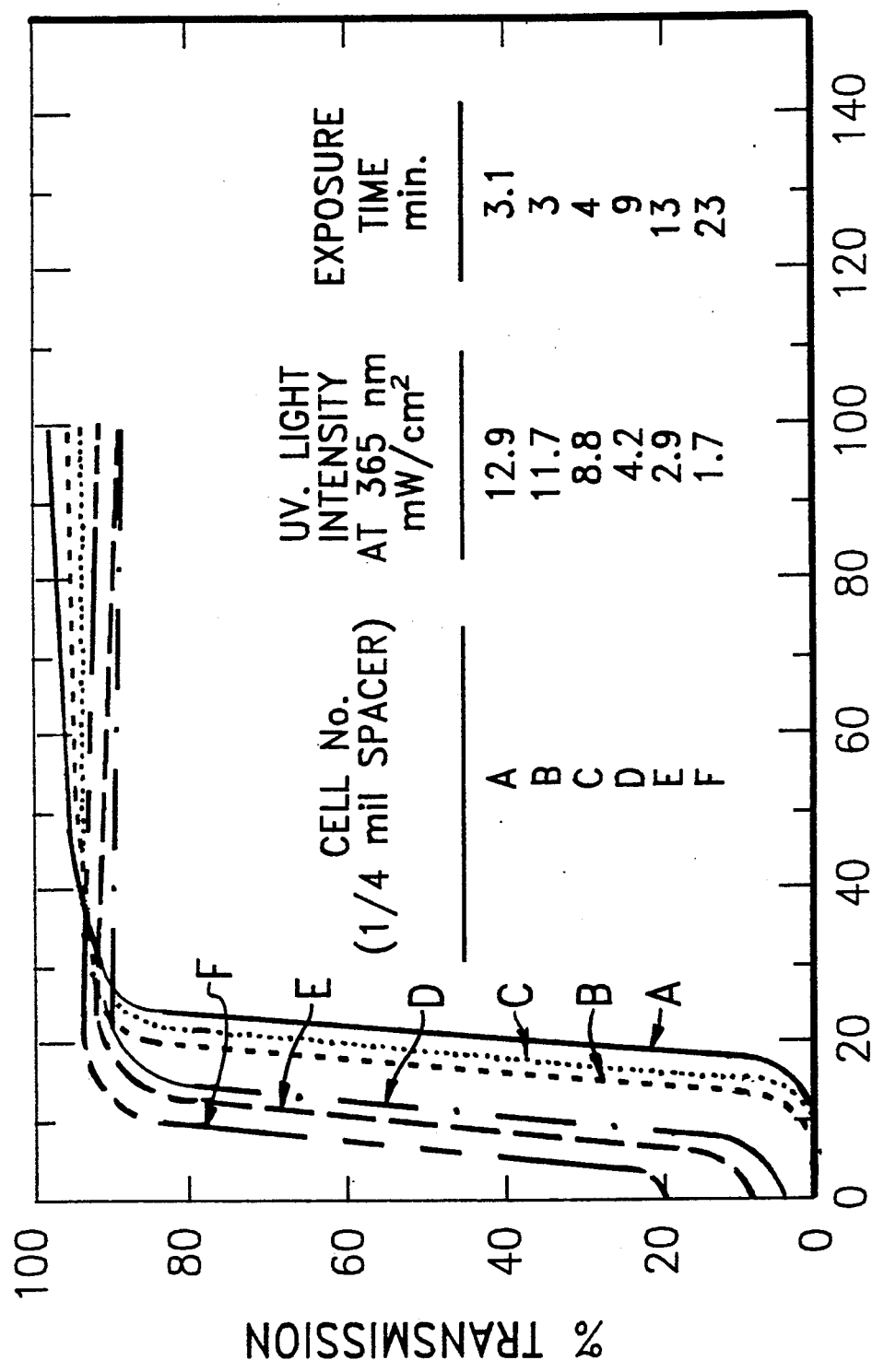
Figure 9:
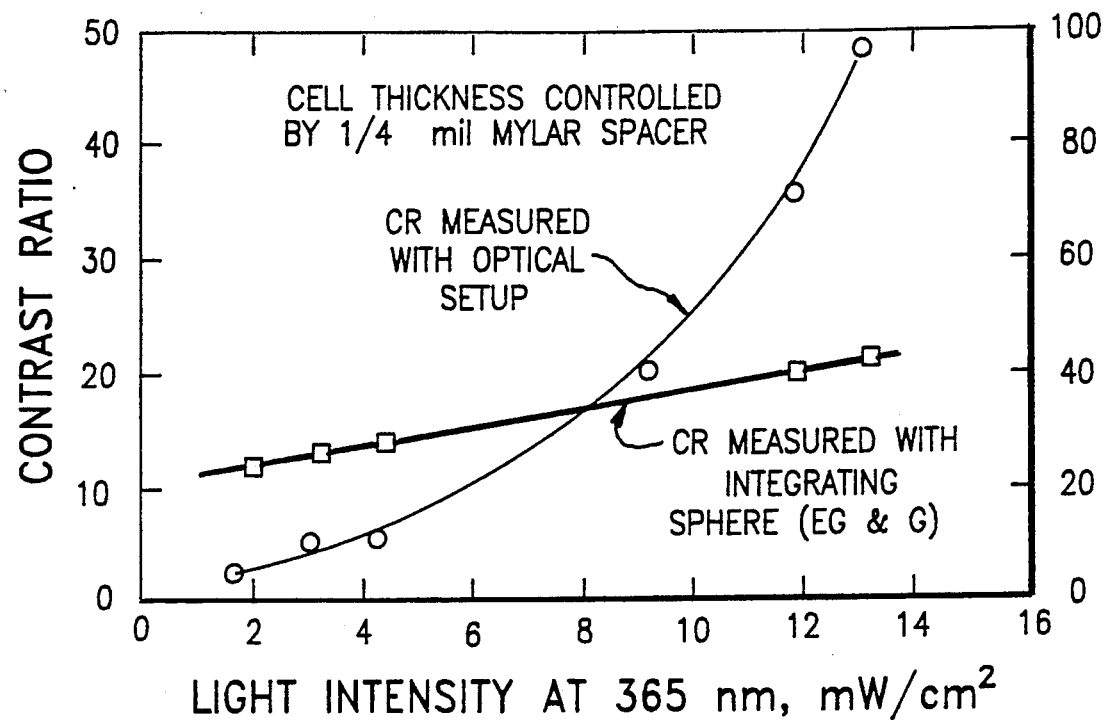

The results are shown in FIGS. 7-9. FIG. 7 plots percent transmissivity as a function of applied voltage. In general, higher exposure intensities resulted in higher operating voltage thresholds. Approximate bubble diameters are plotted in FIG. 8, and show that bubble size generally increased as the exposure intensity decreased. The contrast ratio as a function of exposure intensity is plotted in FIG. 9 for the two different measurement approaches described above. Although the results of the two approaches differed, both showed that contrast ratio increased with increasing exposure intensity.

The transmissivity decay time constant when the applied voltage was turned off was also measured, and demonstrated that the response time increased as the exposure intensity was reduced. The results obtained were:

| Cell No. | Decay Time Constant (MS) |
| --- | --- |
| A | 9 |
| B | 10 |
| C | 10 |
| D | 20 |
| E | 21 |
| F | 29 |

EXAMPLE 3

Figure 10:
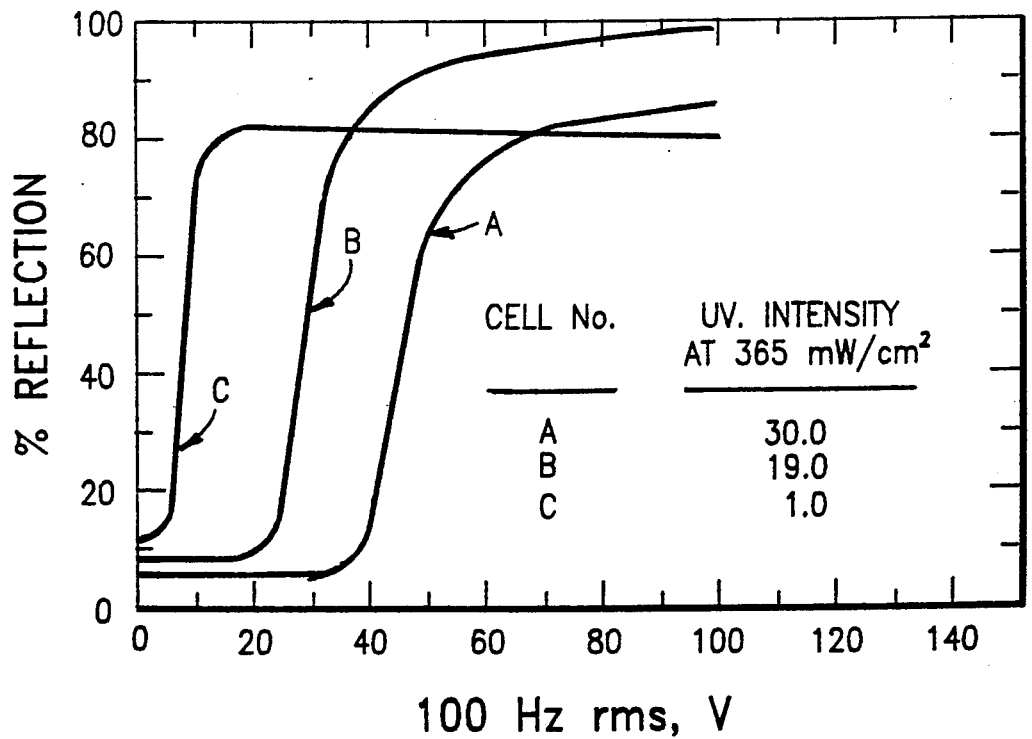
FIGS. 10 and 11 are graphs of electro-optic transmissivity data for two further examples.

The same mixture as in Examples 1 and 2 was placed between ITO coated glass substrates, one of the substrates having a front surface aluminum mirror to fabricate a reflective test cell. Thicknesses were controlled by 0.25 mil spacers, and the test cells were polymerized at three different UV light intensities: 30.0, 19.0 and 1.0 mW/cm$^2$ The reflection vs. voltage data obtained with these test cells is shown in FIG. 10, and clearly shows the effect of exposure intensity upon the bubble size formation.

EXAMPLE 4

An LC, monomer composition and test cell preparation were the same for cells A, B and C in FIG. 11 as for Example 1, but the UV light intensity range was extended to 50 mW/cm$^2$ at 365 nm, using a 1,000 W mercury/xenon lamp for exposure. Three cells were polymerized at 50.0, 12.5 and 2.3 mW/cm$^2$, respectively. Electro-optical data obtained for these test cells is displayed in FIG. 11, and again indicates a positive correlation between higher exposure intensities and smaller LC bubble diameters. Cell D was exposed at 12.5 mW/cm$^2$, but has 3.6% DEAP initiator added to the Norland NOA-65. This resulted in the formation of considerably smaller bubbles.

EXAMPLE 5

Figure 12:
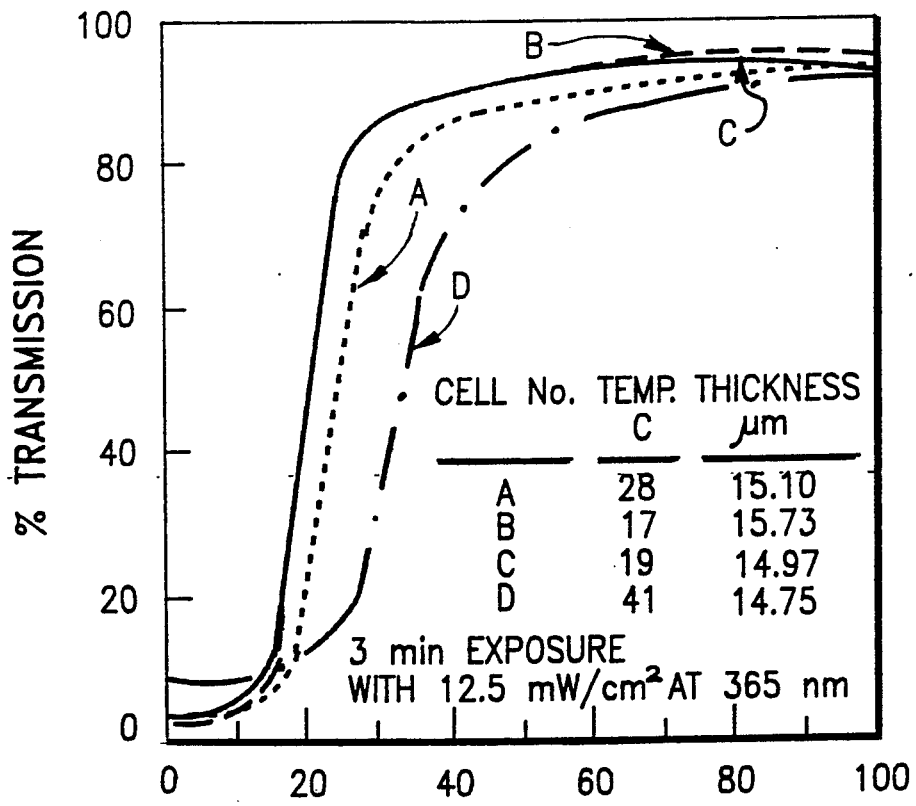
FIG. 12 is a graph relating electro-optic transmissivity to photopolymerization temperature for another example.
Figure 13:
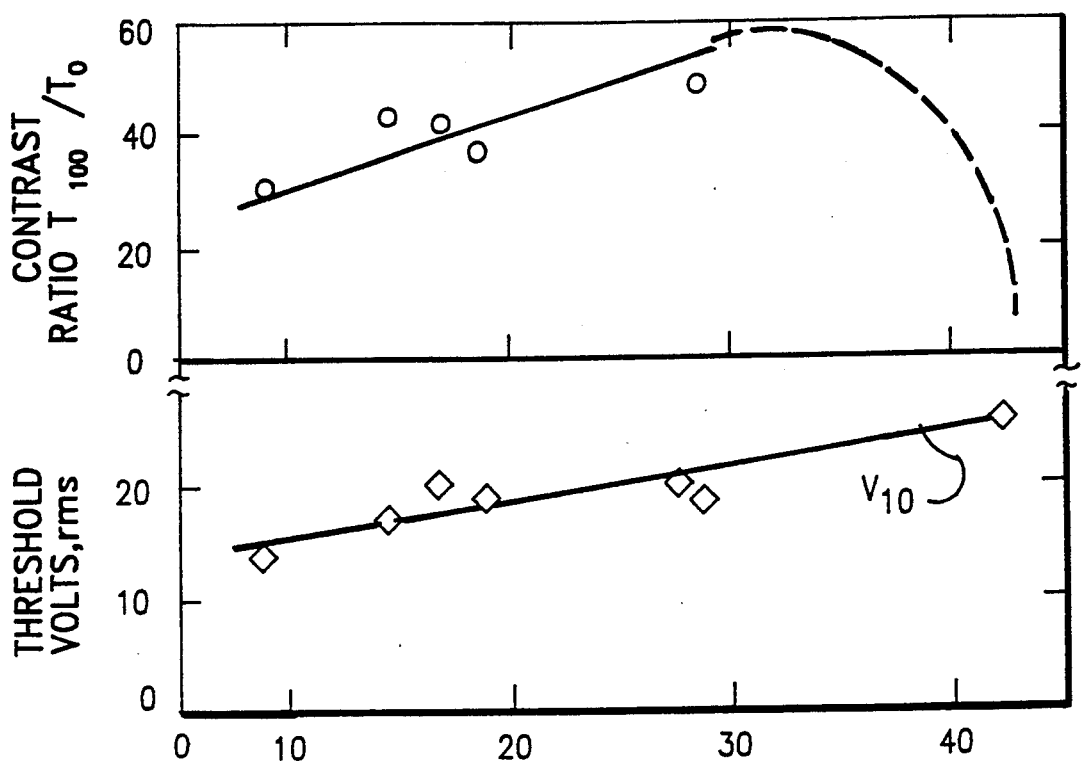
FIG. 13 is a pair of graphs relating threshold voltage and contrast ratio to photopolymerization temperature for the example of FIG. 12.

The same mixture as in the previous examples was flowed into pre-sealed, known thickness ITO coated glass test cells. Contrary to Examples 1-4, in which polymerization took place at about room temperature or 28° C., the temperature during polymerization was varied for different cells in the present example. The samples were photopolymerized at a UV intensity of 12.5 mW/cm$^2$ for 3-minute exposures, with the temperature varied between 9° C. and 41° C. As indicated in FIGS. 12 and 13, the low temperature polymerization resulted in large LC bubbles with a lower operating voltage threshold and contrast ratio, while the best contrast ratio was demonstrated at about 30° C. At 41° C., in addition to obtaining smaller bubbles, the LC partition was apparently less favorable toward bubbles, and more of the LC apparently remained in the polymer phase as plasticizer or extra fine bubbles.

EXAMPLE 6

Figure 14:
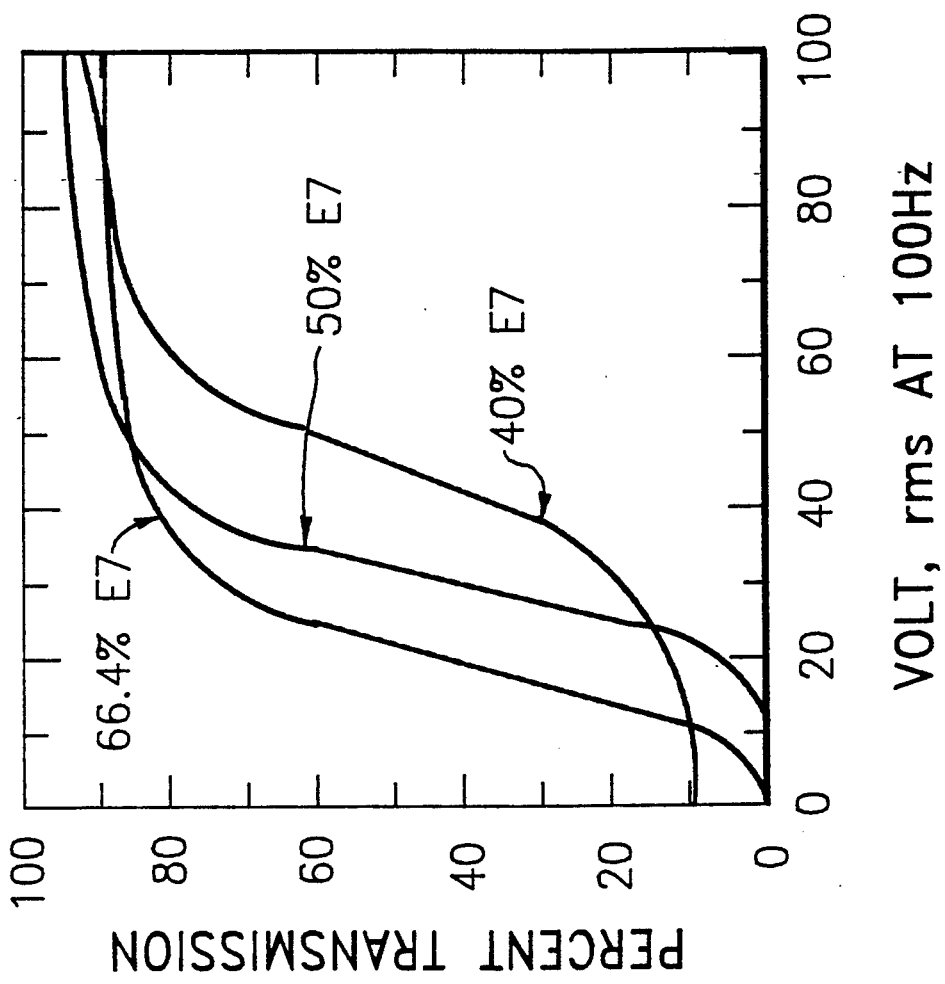
FIG. 14 is a graph relating electro-optic transmissivity to liquid crystal concentration within the PDLC for another example.

In this example, NOA-65 optical adhesive and BDH-E7 LC were again used, but varying LC concentrations were tested. LC volume concentrations of 40%, 50% and 66.4% were selected. ITO coated glass test cells with 0.5 mil spacers were drop filled and polymerized with 3-minute, 16.0 mW/cm² UV exposures. The electro-optic data obtained with these films is summarized in the graph of FIG. 14. It can be seen that the operating voltage thresholds increase with decreasing LC concentration, indicating that higher LC concentrations resulted in larger LC bubbles.

EXAMPLE 7

This example demonstrated photopolymerization at elevated temperatures to increase the LC solubility in the monomer. The LC employed was RO-TN-404, which is a wide temperature range, high birefringence material manufactured by Hoffmann-La Roche & Co., Basle, Switzerland. The monomer used was Norland NOA-65.

Figure 15:
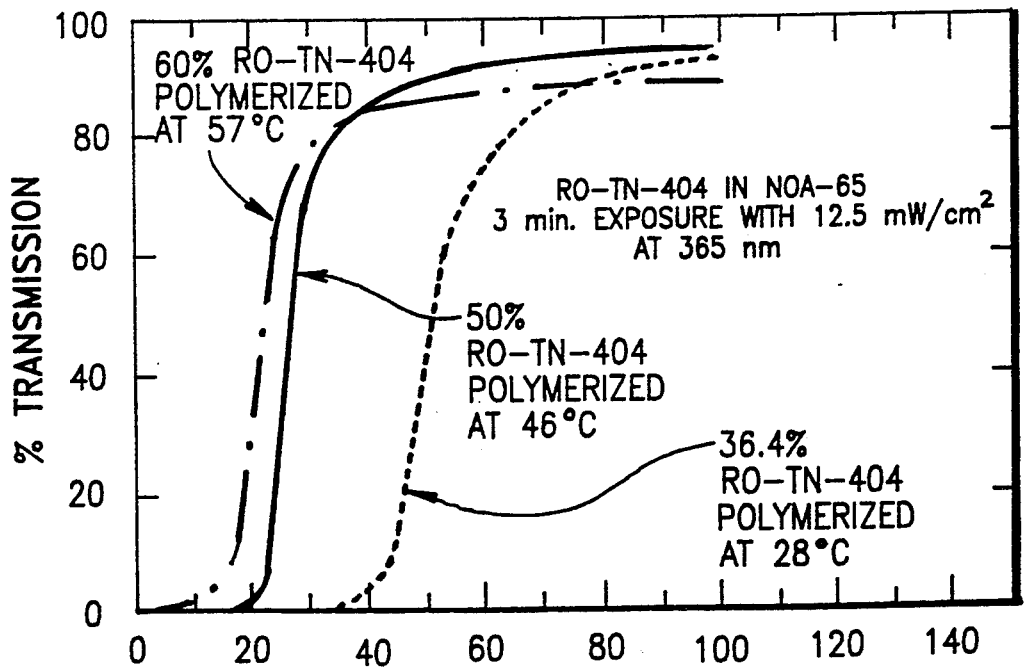
FIG. 15 is a graph relating electro-optic transmissivity to liquid crystal concentration within the PDLC and photopolymerization temperature for another example.

At room temperature the solubility of this LC is limited to about 36%, while at 46° C. and 57° C. the solubility increased to 50% and 60%, respectively. The electro-optic characteristics obtained for the three cells with 3-minute, 365 nm exposures at 12.5 mW/cm² are plotted in FIG. 15. The results are consistent with Example 6, with the operating voltage threshold increasing with decreasing LC concentration. If temperature is isolated without considering the LC concentration, the results might be considered inconsistent with those of Example 5, in which the operating voltage threshold generally increased with increasing temperature. Thus, in this example the effect of altering the LC concentration dominated the effects of changing temperatures.

EXAMPLE 8

A series of experiments was made on the formation of gratings in PDLC films by UV exposure of the LC-monomer solution through a mask with partially transparent Ronchi ruling gratings. Various thicknesses of chromium, corresponding to various levels of UV transmission, were used for the grating rulings, which had a periodicity of 50 microns (25 micron chromium lines and 25 micron open lines). Thus, the UV initiated polymerization rates used in forming the PDLC films were spatially periodic for the areas exposed through the rulings during the 3-minute exposures. In each cell, a region was also exposed simultaneously at full intensity (not through the ruling) as a reference region. The general set-up was as indicated in FIG. 1. The same LC-monomer solution was used as in Example 1.

The chromium transmission, cell spacing and microscope observations are summarized in Table 1 below. The diffraction grating lines observed in the PDLC films did not have the same 25/25 micron chromium patterns, due to a loss of resolution through the 1 mm front glass substrate, and also due to the scattering of UV light in the region first polymerized. Thin cells exposed through chromium with 5–16% transmission showed PDLC grating spacings of 20/30 microns, while thin cells exposed through 0.25% transmission chromium showed spacings of 15/35 microns (the smaller width corresponding to the area under the chromium ruling). Far field diffraction pattern observations with a helium-neon laser (632.8 nm) are summarized in Table 2 for the same cells.

TABLE 1

| Cell # | Cr % T | Cell Thickness, mil | Spatial Lines Observed With On/Off Voltage | | |
|---|---|---|---|---|---|
| | | | Obs. | Cr Line Area | Open Line Area |
| A | 0.25 | 0.5 | Very weak | — | — |
| B | 5.0 | 0.5 | Weak | — | — |
| C | 16.0 | 0.5 | Yes | (35 μm) | (15 μm) |
| D | 0.25 | 0.25 | Yes | 15 μm | 35 μm |
| E | 5.0 | 0.25 | Yes | 20 | 30 |
| F | 13.5 | 0.25 | Yes | 20 | 30 |
| G | 16.0 | 0.25 | Yes | 20 | 30 |

TABLE 2

| Cell # | Diffraction Patterns Observed | | |
|---|---|---|---|
| | No Voltage | Intensity Increase | 100 V |
| A | No | 25 V (weak) | No |
| B | Yes | 20 V | Yes (weak) |
| C | Yes | 25 V | Yes (weak) |
| D | Yes | 15 V | Yes (weak) |
| E | Yes | 15 V | Yes (weak) |
| F | Yes | 20 V | Yes (weak) |
| G | Yes | 20 V | Yes (weak) |

FIGS. 16a and 16b show electro-optic characteristics of Cell No. F for broadband green wavelengths and 632.8 nm red laser light, respectively. An optical bench with a detector having a 2° acceptable angle was used, and comparisons are shown between the grating area and the reference area of the film for the two different wavelengths. In each case the operating voltage threshold for the grating area was less than for the reference area. Because the diffraction effect from an in situ PDLC grating of 50 micron periodicity would be expected to have first and second order diffraction angles of only 0.725° and 1.45°, respectively, the PDLC diffraction grating did not deflect the light beyond the 2° acceptance angle of the detector system. The lower operating voltage threshold and superior red light scattering of the "grating" curves of FIGS. 16a and 16b are attributed to larger LC bubbles formed under the areas of the 13.5% transmission chromium rulings.

Thus, the "grating" curves of FIGS. 16a and 16b are attributed to the composite effect of both large LC bubbles (under the chromium line exposures) and small LC bubbles (under the open lines in the ruling). This effect is diagrammed in the theoretical graphs of FIGS. 17a and 17b, which plot the percent transmission and refractive index, respectively, of the large and small LC bubble sizes as a function of applied voltage. The transmissivity is shown as being larger for large LC bubbles beyond a minimal voltage level, while the refractive index is smaller for large LC bubbles.

Figure 18:
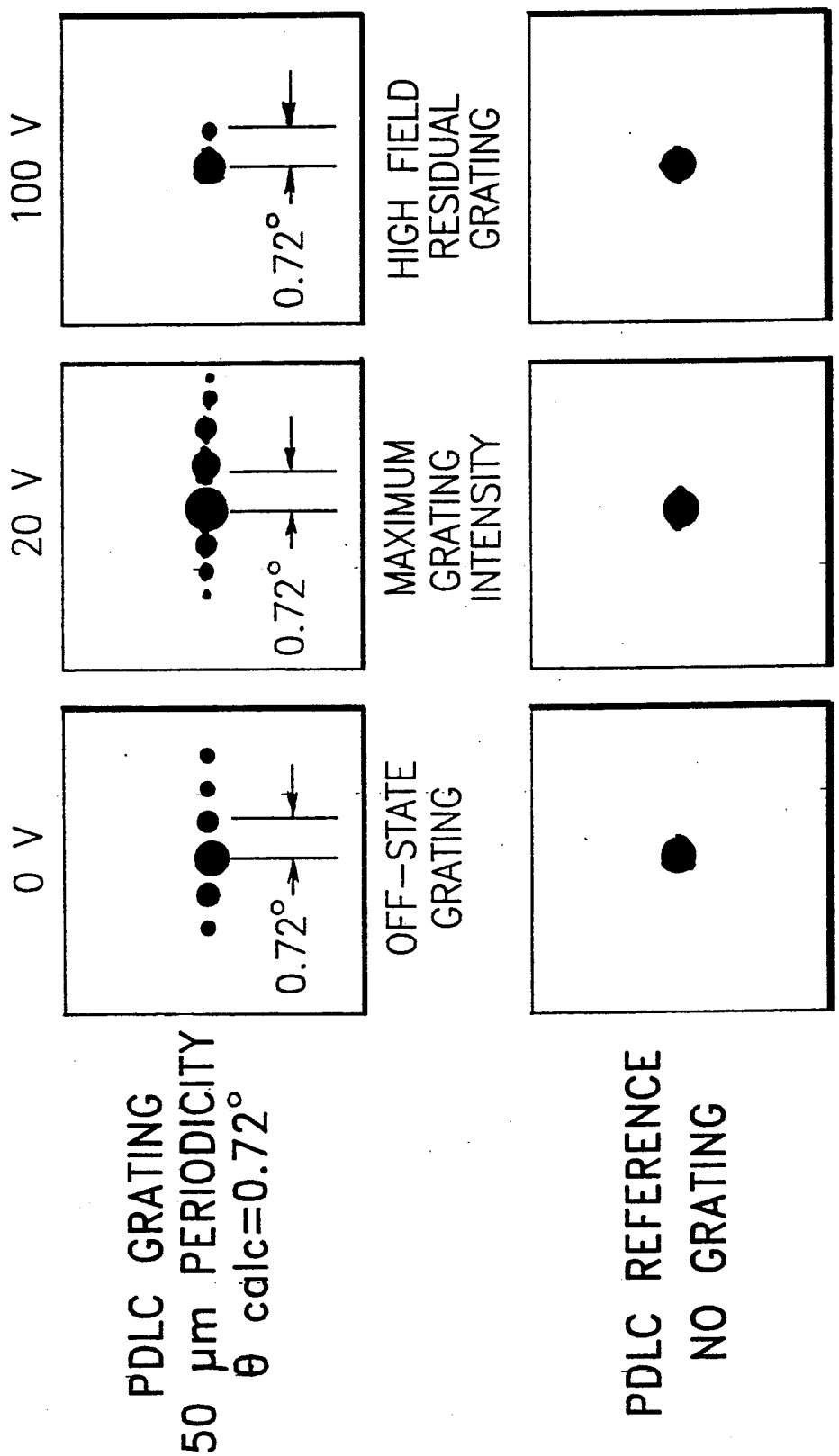
FIG. 18 is a set of drawings of photographs showing the diffraction effect of a PDLC grating formed in accordance with the invention.

Drawings of the far field diffraction of the helium-neon laser by Cell No. F are shown in FIG. 18 for applied voltages of 0, 20 and 100 volts. Results with the PDLC gratings are shown in the top row, and for the PDLC reference without gratings in the bottom row. The exposure times for each different applied voltage varied, but the exposure times for the PDLC grating and reference were equal for each given voltage level. The observed diffraction order angles were as calculated for a 50 micron periodicity. The diffraction intensity is seen to increase at the intermediate voltage of 20 volts, but some residual diffraction effects remained even when the high voltage (100 V) was used to clear the scattering of the LC bubbles as they become field-oriented and nearly matched the refractive index of the polymer.

Figure 19:
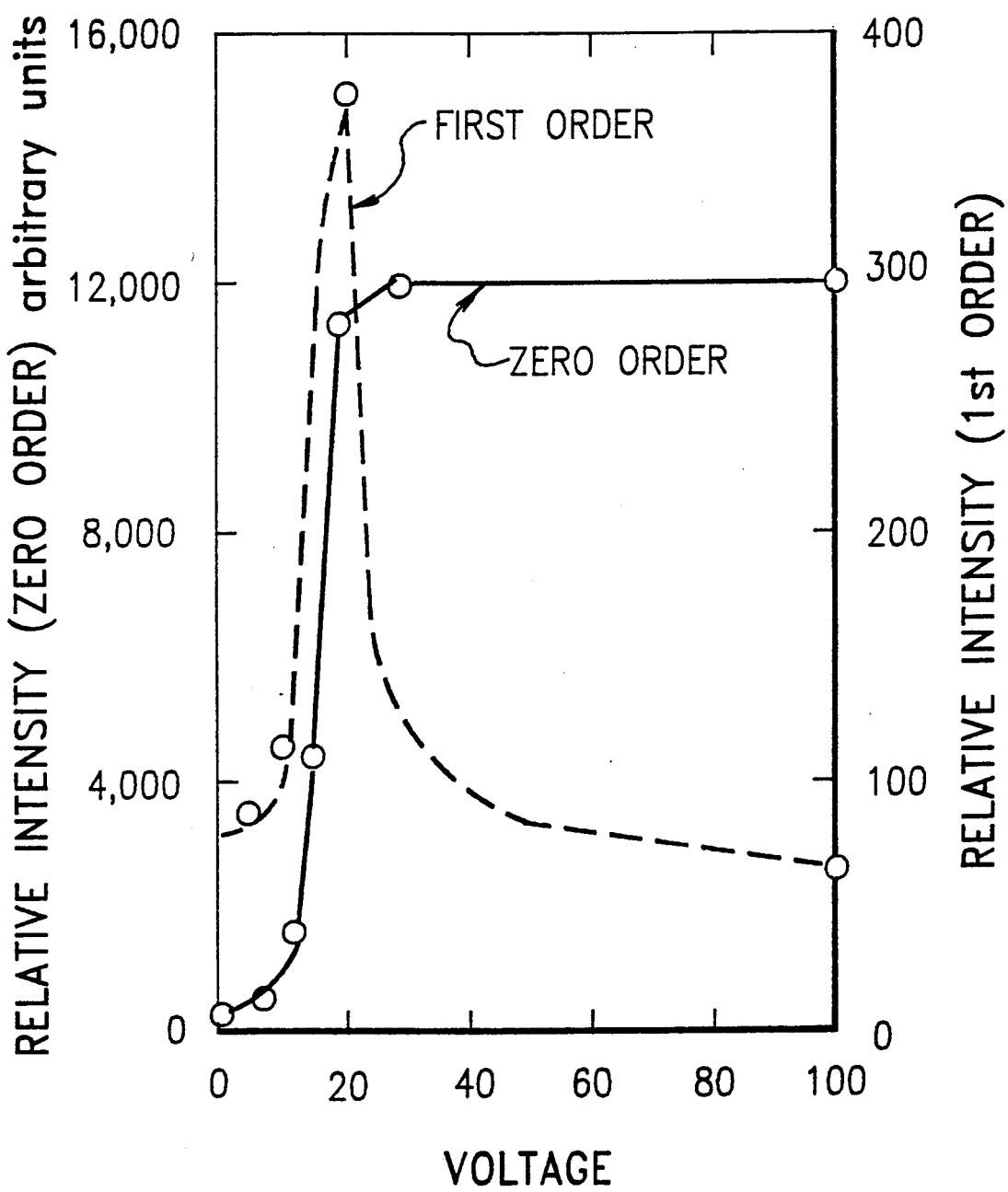
FIG. 19 is a graph relating the relative intensity of the PDLC gratings to applied voltage for the same example as FIGS. 16a–18.

A detector with a small acceptance angle of only 0.3° was used to obtain the results shown in FIG. 19 for the zero order and first order intensity of Cell No. F, for 632.8 nm in the grating region. The zero order intensity increased as the light scattering decreased. The first order intensity peaked at about 20 V, and is much lower in intensity than the zero order. As mentioned above, the residual grating effect at high applied fields may be due to differences in the amount of plasticized LC molecules or extremely fine LC bubbles remaining in the polymer, rather than separating as the measurable LC bubbles discussed herein.

Figure 20:
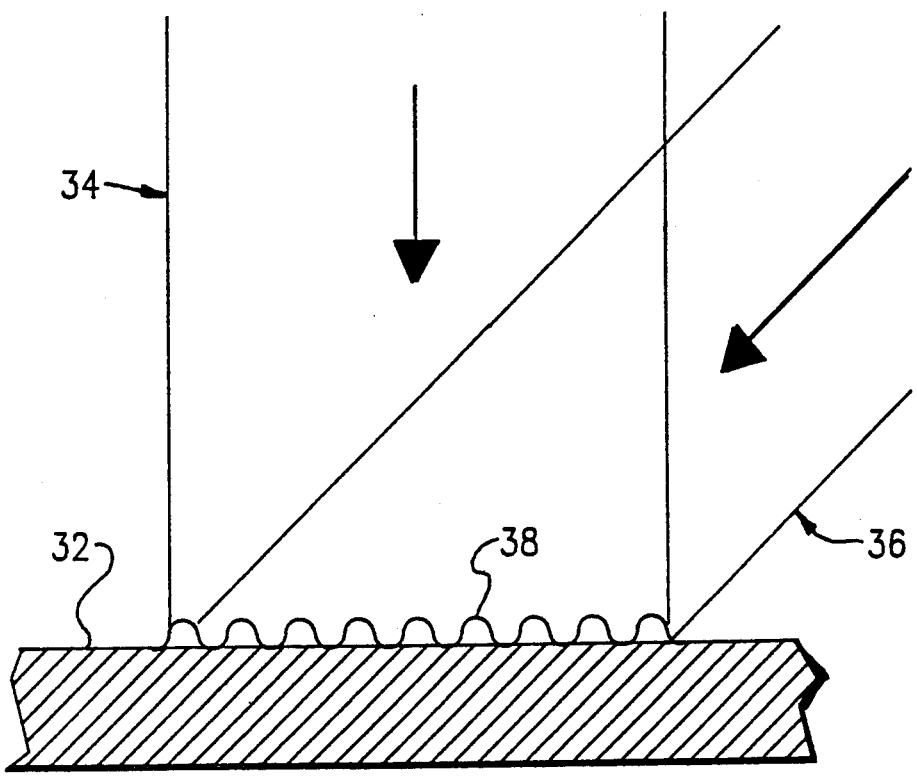
FIG. 20 is an elevation view illustrating the formation of a holographic interference pattern in a PDLC in accordance with the invention.
Figure 21:
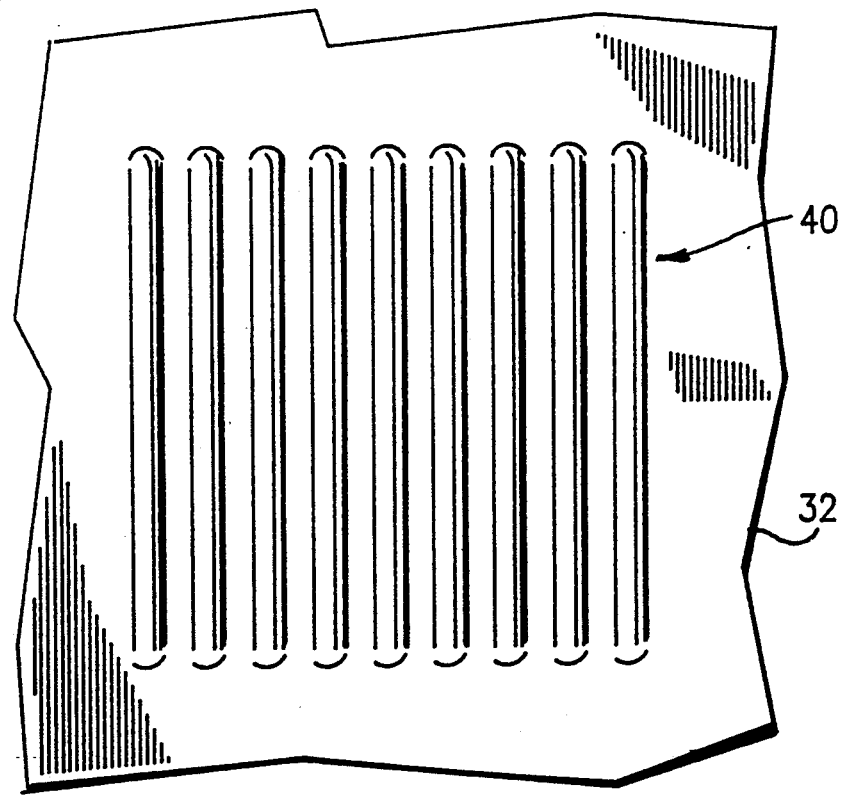
FIG. 21 is a plan view illustrating the interference pattern resulting from the fabrication method of FIG. 20.

Another application for the invention, alluded to above, is illustrated in FIGS. 20 and 21. In this application the PDLC film 32 is photopolymerized by a reference laser beam 34 and an laser object beam 36, which are selected and directed onto the film at appropriate angles to form a holographic interference pattern 38 (the waves of pattern 38 represent alternating areas of constructive and destructive interference between the two beams). At the areas of constructive interference, in which the net light intensity is greatest, smaller LC bubbles will be formed in the film; the reverse is true for the areas of destructive interference. As illustrated in FIG. 21, a holographic interference pattern 40 of periodically alternating areas of greater and smaller LC bubble sizes will thus be imposed upon the film 32. The bubbles preferably range from about 0.2 microns to 2 microns in diameter, with a periodicity in the order of a few microns. In this manner a hologram can be recorded on the film simultaneous with its polymerization.

A novel technique for controlling the photopolymerization of PDLC films to obtain desired film characteristics, and several unique types of films that can be produced with this technique, have thus been shown and described. Since numerous variations and alternate embodiments will occur to those skilled in the art, it is intended that the invention be limited only in terms of the appended claims.

We claim:

1. An optical grating film, comprising:
   a polymer film, and
   an array of liquid crystal (LC) bubbles dispersed throughout the film, the sizes of said bubbles varying in one direction along the film in a periodic fashion between alternating regions of larger and smaller bubbles so as to form diffraction grating.

2. The optical grating film of claim 1 wherein the light scattering by said diffraction grating varies as a function of applied voltage.

3. The optical grating film of claim 1, wherein said bubble sizes vary with a periodicity in the approximate range of 10–300 microns.

4. The optical grating film of claim 3 wherein the light scattering by said diffraction grating varies as a function of applied voltage.

5. A polymer dispersed liquid crystal (LC) film, comprising:
   a polymer film, and
   a plurality of LC bubbles dispersed throughout said film, the sizes of said bubbles varying in accordance with their spatial locations within the film in a periodic fashion through the film.

6. A hologram film, comprising:
   a polymer film, and
   an array of liquid crystal (LC) bubbles dispersed throughout the film, the sizes of said bubbles varying in accordance with a periodic holographic interference pattern.

7. The holographic film of claim 6 wherein the holographic efficiency of the film varies with the applied voltage.

* * * * *